US012031715B2

United States Patent
Van Bommel et al.

(10) Patent No.: US 12,031,715 B2
(45) Date of Patent: Jul. 9, 2024

(54) PIXELATED LASER PHOSPHOR COMPRISING CERAMIC PHOSPHOR TILES SURROUNDED BY PHOSPHOR PARTICLES IN A MEDIUM

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Hugo Johan Cornelissen, Escharen (NL); Olexandr Valentynovych Vdovin, Maarheeze (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/273,208

(22) PCT Filed: Jan. 19, 2022

(86) PCT No.: PCT/EP2022/051146
§ 371 (c)(1),
(2) Date: Jul. 19, 2023

(87) PCT Pub. No.: WO2022/161831
PCT Pub. Date: Aug. 4, 2022

(65) Prior Publication Data
US 2024/0084999 A1    Mar. 14, 2024

(30) Foreign Application Priority Data
Jan. 26, 2021    (EP) ..................... 21153372

(51) Int. Cl.
C09K 11/08    (2006.01)
C09K 11/02    (2006.01)
(Continued)

(52) U.S. Cl.
CPC .............. F21V 9/38 (2018.02); C09K 11/025 (2013.01); C09K 11/7701 (2013.01); F21V 9/32 (2018.02);
(Continued)

(58) Field of Classification Search
CPC ........... F21V 9/38; F21V 9/32; C09K 11/025; C09K 11/7701
See application file for complete search history.

(56) References Cited

U.S. PATENT DOCUMENTS

2015/0055319 A1* 2/2015 Zink ......................... F21V 9/08
362/84
2018/0301869 A1* 10/2018 Maemura ............. C09K 11/777
(Continued)

FOREIGN PATENT DOCUMENTS

EP          3543596 A1     9/2019
WO       2016116327 A1     7/2016
(Continued)

OTHER PUBLICATIONS

Shuxing Rsc Li et al: "Al 2 O 3; YAG: Ce Composite Phosphor Ceramic: a Thermally Robust and Efficient Color Converger for Solid State Laser Lighting", J. Mater. Chem. CJ Mater Chem. C, Jan. 1, 2016, pp. 8648-8648.
(Continued)

*Primary Examiner* — Tracie Y Green

(57) ABSTRACT

The invention provides a luminescent arrangement (2000) comprising an array (2005) of luminescent bodies (2100), and a matrix (2210) at least partly configured between the luminescent bodies (2100), wherein the luminescent bodies (2100) comprise a first luminescent material (2110), wherein the matrix (2210) comprise a light transmissive material (2215), wherein the light transmissive material (2215) comprises a second luminescent material (2220), wherein the
(Continued)

first luminescent material (2110) and the light transmissive material (2215) are different materials; and wherein the luminescent bodies (2100) comprise ceramic bodies.

15 Claims, 7 Drawing Sheets

(51) Int. Cl.
    *C09K 11/77*     (2006.01)
    *F21V 9/32*     (2018.01)
    *F21V 9/38*     (2018.01)
    *F21V 9/40*     (2018.01)
    *H05B 33/18*     (2006.01)
    *H05B 33/20*     (2006.01)
    *F21W 131/20*     (2006.01)
    *F21W 131/30*     (2006.01)
    *F21Y 115/10*     (2016.01)
    *F21Y 115/30*     (2016.01)

(52) U.S. Cl.
    CPC ........... *F21V 9/40* (2018.02); *F21W 2131/20* (2013.01); *F21W 2131/30* (2013.01); *F21Y 2115/10* (2016.08); *F21Y 2115/30* (2016.08)

(56) References Cited

U.S. PATENT DOCUMENTS

2019/0198720 A1   6/2019   Chamberlin et al.
2020/0173615 A1*   6/2020   Abe .......................... F21K 9/64
2023/0323198 A1*   10/2023   Inomata ................ C09K 11/02
                                                                                   428/323

FOREIGN PATENT DOCUMENTS

WO     2020114817 A1   6/2020
WO     2020254439 A1   12/2020

OTHER PUBLICATIONS

Jan Ziegler et al: "Silica-Coated InP/ZnS Nanosrystals as Converter Material in White LEDs", Advanced Materials, vol. 20, No. 21, Nov. 3, 2008, pp. 4068-4073.

* cited by examiner

PIXELATED LASER PHOSPHOR COMPRISING CERAMIC PHOSPHOR TILES SURROUNDED BY PHOSPHOR PARTICLES IN A MEDIUM

CROSS-REFERENCE TO PRIOR APPLICATIONS

This application is the U.S. National Phase application under 35 U.S.C. § 371 of International Application No. PCT/EP2022/0511, filed on Jan. 19, 2022, which claims the benefit of European Patent Application No. 21153372.4, filed on Jan. 26, 2021. These applications are hereby incorporated by reference herein.

FIELD OF THE INVENTION

The invention relates to a luminescent arrangement and to a light generating system comprising such luminescent arrangement. Further, the invention relates to a light generating device, comprising such light generating system.

BACKGROUND OF THE INVENTION

Light sources, such as laser light sources, are known in the art. US20180316160, for instance, describes an integrated white light source comprising: a laser diode device comprising a gallium and nitrogen containing material and configured as an excitation source; a phosphor member configured as a wavelength converter and an emitter and coupled to the laser diode device; a common support member configured to support the laser diode device and the phosphor member, a heat sink thermally coupled to the common support member, the common support member configured to transport thermal energy from the laser diode device and phosphor member to the heat sink; an output facet configured on the laser diode device to output a laser beam comprised of electromagnetic radiation selected from a violet and/or a blue emission with a first wavelength ranging from 400 nm to 485 nm; a free space, between the output facet and the phosphor member with a non-guided characteristic capable of transmitting the laser beam from the laser diode device to an excitation surface of the phosphor member; a range of angles of incidence between the laser beam and the excitation surface of the phosphor member so that on average the laser beam has an off-normal incidence to the excitation surface and a beam spot is configured for a certain geometrical size and shape; wherein the phosphor member converts a fraction of the electromagnetic radiation from the laser beam with the first wavelength to an emitted electromagnetic radiation with a second wavelength that is longer than the first wavelength; a plurality of scattering centers associated with the phosphor member to scatter electromagnetic radiation with the first wavelength from the laser beam incident on the phosphor member; a reflective mode characterizing the phosphor member such that the laser beam is incident on a beam spot area on the excitation surface of the phosphor member and a white light emission is outputted substantially from the same beam spot area, the white light emission being comprised of a mixture of wavelengths characterized by at least the second wavelength emitted electromagnetic radiation from the phosphor member; and a form factor characterizing a package of the integrated white light source, the form factor having a length, a width, and a height dimension.

SUMMARY OF THE INVENTION

While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

High brightness light sources can be used in applications such as projection, stage-lighting, spot-lighting and automotive lighting. For this purpose, laser-phosphor technology can be used wherein a laser provides laser light and e.g. a (remote) phosphor converts laser light into converted light. The phosphor may in embodiments be arranged on or inserted in a heatsink for improved thermal management and thus higher brightness.

One of the problems that may be associated with such (laser) light sources is the heat management of the (ceramic) phosphor. Other problems associated with such laser light sources may be the desire to create compact high power devices, which may not always be relatively easy. Yet other problems may be the desire to control beam shapes and/or spatial power distributions of beams escaping from the phosphor.

Hence, it is an aspect of the invention to provide an alternative luminescent arrangement and/or light generating system, which preferably further at least partly obviate one or more of above-described drawbacks. The present invention may have as object to overcome or ameliorate at least one of the disadvantages of the prior art, or to provide a useful alternative.

In a first aspect, the invention provides a luminescent arrangement comprising an array of luminescent bodies, and a matrix at least partly configured between the luminescent bodies. In embodiments, the luminescent bodies comprise a first luminescent material. Further, in specific embodiments the matrix may comprise a light transmissive material. Especially, the light transmissive material may comprise a second luminescent material (which may in embodiments be the same and which may in embodiments be different from the first luminescent material). Especially, the first luminescent material and the light transmissive material are different materials. Further, in specific embodiments the luminescent bodies comprise ceramic bodies. Therefore, especially the invention provides in embodiments a luminescent arrangement comprising an array of luminescent bodies, and a matrix at least partly configured between the luminescent bodies, wherein the luminescent bodies comprise a first luminescent material, wherein the matrix comprise a light transmissive material, wherein the light transmissive material comprises a second luminescent material, wherein the first luminescent material and the light transmissive material are different materials; and wherein in specific embodiments the luminescent bodies comprise ceramic bodies.

Such luminescent arrangement allows creating different beam shapes of the luminescent material in dependence of focusing a beam of excitation light. Optionally, such luminescent arrangement allows providing different spectral power distributions in dependence of focusing a beam of excitation light; this may especially be the case when there are different luminescent materials. Further, such luminescent arrangement may allow controlling beam shape and spectral power distribution of the (luminescent material) light that escapes from the arrangement in dependence of the light sources that are used to irradiate the luminescent arrangement. Further, such arrangement may reduce stress, e.g. due to heating, as the luminescent bodies do not form a single large body, but are provided as plurality of (smaller) bodies. Hence, heat management may be optimized. Further, it may be easier to provide smaller luminescent bodies than (a single) larger luminescent body (bodies). Hence, production may be easier and lifetime may be longer.

As indicated above, the invention provides a luminescent arrangement. The luminescent arrangement comprises an array of luminescent bodies, and a matrix, at least partly configured between the luminescent bodies.

In embodiments, both the luminescent bodies and the matrix may comprise a luminescent material. Here below, some aspect of luminescent materials are described. These aspects may apply to both the first luminescent material and the second luminescent material.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise up-converter luminescent material, i.e. radiation of a larger wavelength is converted into radiation with a smaller wavelength ($\lambda_{ex} > \lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. Examples of possible luminescent materials are indicated below.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3<0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein x1+x2+x3=1, wherein x3>0, 0<x2+x3<0.2, wherein y1+y2=1, wherein 0<y2<0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

In embodiments, the luminescent material may alternatively or additionally comprise one or more of $M_2Si_5N_8$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)AlSiN$_3$:

Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials.

Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

As indicated above, the luminescent bodies comprise a first luminescent material.

In embodiments, the first luminescent material may comprise any of the above indicated luminescent materials (and/or another luminescent material). Especially, however, in embodiments the first luminescent material may comprise an inorganic crystalline material, such as a polycrystalline material (see further also below).

As indicated above, the term "luminescent material" may also refer to a plurality of different luminescent materials. Hence, the term "luminescent material" may in specific embodiments also refer to a luminescent material composition.

Two or more of the luminescent bodies may comprise the same (first) luminescent material. However, two or more of the luminescent bodies may also comprise different luminescent materials. In specific embodiments, however, the luminescent bodies may essentially be the same, at least with respect to the luminescent material. Hence, in embodiments under essentially the same irradiation essentially the same luminescence may be generated. Hence, in specific embodiments each luminescent body comprises the same first luminescent material.

The luminescent bodies may have a rectangular shape or a circular shape, or a hexagonal shape, or an octagonal shape. Especially, the luminescent bodies may have a rectangular shape, like a square shape. However, others shapes may also be possible, such as rectangular with rounded corners, oval, etc. In specific embodiments, rectangular may be square; in other embodiments rectangular may be non-square. In embodiments, all the luminescent bodies may have the same shape. In other embodiments, the luminescent bodies may comprise 2-4 types of different shapes, like two different shapes. Especially, the shape refers to a cross-sectional shape, perpendicular to a height of the luminescent bodies.

The luminescent bodies may have a height (H) and an equivalent circular diameter (D'). The equivalent circular diameter (or ECD) (or "circular equivalent diameter") of an (irregularly shaped) two-dimensional shape is the diameter of a circle of equivalent area. For instance, the equivalent circular diameter of a square with side a is $2*a*SQRT(1/\pi)$. For a circle, the diameter is the same as the equivalent circular diameter. Would a circle in an xy-plane with a diameter D be distorted to any other shape (in the xy-plane), without changing the area size, than the equivalent circular diameter of that shape would be D.

The height may in embodiments be selected from the range of at least 0.02 mm, such as at least 0.025 mm (25 mµ), like at least 0.03 mm, like in embodiments selected from the range of 0.03-20 mm. Especially, in embodiments the height of the luminescent bodies may be selected from the range of 0.05-20 mm, such as 0.05-10 mm, like 0.05-5 mm. Especially, the height may in embodiments be selected from the range of 0.05-1 mm, like 0.1-0.5 mm. All luminescent bodies may have the same height, even though in specific embodiments the luminescent bodies may comprise 2-4 different types of cross-sectional shapes. Nevertheless, in other embodiments the luminescent bodies may have different heights, like 2-4 different heights.

The luminescent bodies may have an edge. In the case of a circular cross-section, the edge comprises a single edge (or single edge element), in the case of a triangular cross-section, the edge comprises three edges (or three edge elements), and in the case of a rectangular cross-section, the edge comprises four edges (or three edge elements), etc. The edge may especially be defined by the height.

The equivalent circular diameter may be selected from the range of 0.2-100, such as 0.2-80 mm, such as selected from the range of 0.2-80 mm, like e.g. 0.5-50 mm, such as especially 1-50 mm, such as in specific embodiments 1-40 mm. In specific embodiments, see also above, the luminescent bodies may have a width and a length. In embodiments, the width and length may individually be selected from the range of 0.2-100, such as 0.2-80 mm, such as selected from the range of 0.2-80 mm, like e.g. 0.5-50 mm, such as especially 1-50 mm, such as in specific embodiments 1-40 mm. Especially, in embodiments the equivalent circular diameter may be selected from the range of 0.2-50 mm, such as especially 0.5-25 mm, like in embodiments 1-20 mm. As can be derived from the above, even when the luminescent bodies have a width and a length, the luminescent bodies may have equivalent circular diameters, and may be characterized thereby.

In specific embodiments, the equivalent circular diameter, which may be indicated with D' may be larger than the height. Especially, $D' \geq 2*H$, such as in specific embodiments $2*H \leq D' \leq 5000*H$. Especially, in embodiments $2*H \leq D' \leq 1000*H$. In yet further specific embodiments, $2*H \leq D' \leq 500*H$, like in embodiments $5*H \leq D' \leq 200*H$.

Further specific embodiments in relation to the luminescent bodies are described below, after some embodiments in relation to the matrix.

The arrangement comprises in addition to the luminescent bodies a matrix. Especially, the luminescent bodies and the matrix may form an arrangement wherein the edges of the luminescent bodies may touch the matrix (or matrix material). Hence, the matrix may enclose at least part of the edges of the luminescent bodies, or may in specific embodiments essentially fully enclose the edges of the luminescent body. Therefore, in embodiments the matrix (material) may be in physical contact with (the edges of) the luminescent bodies. Hence, in embodiments the luminescent bodies may be configured embedded in the matrix (material). In such embodiments, the arrangement may essentially be an arrangement body. However, other embodiments may also be possible.

The matrix may have a matrix height H1. In embodiments, the matrix height is the same height as the luminescent bodies. In other embodiments, however, the matrix height may be smaller than the luminescent bodies. Hence, the luminescent bodies may protrude from the matrix. In yet other embodiments, the luminescent bodies may have a smaller height than the matrix. In such embodiments, the luminescent bodies may form (shallow) cavities, though in other embodiments the matrix (material) may cover the luminescent bodies. Combinations of such embodiments may also be possible.

Hence, in specific embodiments the matrix height (H1) is essentially the same as the luminescent body height (H), i.e. $H1 \approx H$ (such as $H1=H$). In such embodiments, light may be emitted of areas of the same height. In yet other embodiments, $0.5*H1 < H \leq 0.95*H1$. When the matrix has a higher height, this may e.g. allow covering the luminescent body with matrix (material), which may protect the luminescent bodies. Further, light of the luminescent bodies may be partly smeared out over the matrix. In yet other embodiments, $1.05*H1 \leq H \leq 2*H1$. When the matrix has a lower height, this may allow an easier production of the arrangement. Further, when the height of the luminescent body is higher than the matrix, light may in embodiments also better escape from the luminescent body. However, in yet other embodiments, $0.95*H1 \leq H \leq 1.05*H1$. When having essentially the same height, this may facilitate handling the arrangement. Especially, the matrix may essentially have the same height all over the matrix.

The matrix comprises a matrix material. Hence, the "matrix" may (in embodiments) also be indicated as "matrix material". The matrix material comprise a light transmissive material, wherein the light transmissive material comprises a second luminescent material. Hence, the matrix comprise a light transmissive material, wherein the light transmissive material comprises a second luminescent material.

The light transmissive material may allow transmission of excitation light into the bulk of the light transmissive material, allowing excitation of luminescent elements. Further, the light transmissive material may allow transmission of the second luminescent material light (of the second luminescent material). First luminescent material light that may be coupled into the matrix, may also be transmitted by the light transmissive material.

In embodiments, the light transmissive material may comprise a glass with luminescent ions. In embodiments, the light transmissive material may comprise a glass, with luminescent particles embedded therein. The luminescent particles may comprise a luminescent material as described above.

Examples of glasses may be borosilicate glasses or phosphate glasses. Other glasses may also be possible, such soda-lime glasses, germanate glasses, fluoride glasses, chalcogenide glasses, etc. In embodiments, silica glass or fused silica, fused quartz, may be applied.

In embodiments, the light transmissive material may comprise an inorganic polymeric material, with luminescent ions. In embodiments, the light transmissive material may comprise an inorganic polymeric material, with luminescent particles embedded therein. For instance, the polymeric material may comprise a silicate, such as water glass. The luminescent particles may comprise a luminescent material as described above.

In embodiments, the light transmissive material may comprise an organic polymeric material, with luminescent molecules. In embodiments, the light transmissive material may comprise an organic polymeric material, with luminescent particles embedded therein. The luminescent particles may comprise a luminescent material as described above. In embodiments, the light transmissive material may comprise one or more materials selected from the group consisting of a transmissive organic material, such as selected from the group consisting of PE (polyethylene), PP (polypropylene), PEN (polyethylene napthalate), PC (polycarbonate), polyurethanes (PU), polymethylacrylate (PMA), polymethylmethacrylate (PMMA) (Plexiglas or Perspex), polymethacrylimide (PMI), polymethylmethacrylimide (PMMI), styrene acrylonitrile resin (SAN), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. one or more of polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN). Especially, the light transmissive material may comprise polyethylene terephthalate (PET). Hence, the light transmissive material is especially a polymeric light transmissive material.

Other matrix materials may in specific embodiments also be applied, like quarts or silica. Especially, the matrix comprises a monolithic body, wherein the luminescent bodies are at least partly embedded. For instance, polymeric material or glass may be provided in the openings between an array of luminescent bodies configured at non-zero distances of each other. This may provide a tile (like) arrangement of luminescent bodies integrated in a common matrix (material).

As can be derived from the above, in specific embodiments the matrix is at least partly defined by a continuous phase wherein the luminescent bodies are at least partly embedded in the continuous phase. Therefore, in specific embodiments the continuous phase may comprise an organic polymeric material and/or in embodiments the continuous phase comprise an inorganic material.

In specific embodiments, the matrix may (thus) at least partly be defined by a continuous phase with luminescent particles embedded therein, wherein the luminescent particles comprise the second luminescent material, and wherein the luminescent bodies are at least partly embedded in the continuous phase.

In embodiments, the second luminescent material may comprise any of the above indicated luminescent materials (and/or other luminescent materials). In embodiments, the second luminescent material may comprise a single type of luminescent material. In other embodiments the second luminescent material comprises two or more different luminescent materials. Especially, in embodiments the second luminescent material may homogeneously be distributed over the matrix. For instance, the luminescent particles may be homogeneously distributed in the light transmissive (matrix) material.

In embodiments, the luminescent particles comprising the second luminescent material in the matrix may be quantum dots. In other embodiments, the luminescent particles comprising the second luminescent material may comprise polycrystalline phosphor particles. In yet other embodiments, the luminescent particles comprising the second luminescent material may comprise small fractions of single-crystalline phosphor, such as crystallites. Especially, in embodiments the luminescent particles comprising the second luminescent material may comprise an inorganic crystalline material, such as a polycrystalline material. Two or more of such embodiments may also be combined.

When the matrix material comprises luminescent particles comprising the second luminescent material, then the particles have in embodiments dimensions smaller, especially substantially smaller, than the luminescent bodies. The dimensions of the particles, like, length, width, height, diameter(s) may be selected from the range of up to about 100 µm, even more especially up to about 80 µm, like equal to or smaller than 50 µm. In embodiments, at least 75 wt. % of the luminescent particles have dimensions of the particles, like, length, width, height, diameter(s) may be selected from the range of up to about 80 µm, selected from the range of up to about 80 µm. In embodiments, the number averaged particle size may be equal to or smaller than 25 µm. In the case of quantum dots, the sizes may be much smaller, unless quantum dots embedded in other material are applied (as particles). Hence, the (quantum dot) particles may have sizes of at least about 2 nm. Especially, in embodiments, the particles may have number averaged particle sizes of at least 2 nm, such as at least 4 nm.

Particle sizes may be determined with methods known in the art, like one or more of optical microscopy, SEM (scanning electron microscope) and TEM (transmission electron microscopy). Dimensions may be number averaged, as known in the art. Hence, the particles may be substantially identical, but the particles may also mutually differ, such as two or more subsets of particles, wherein within the subsets the particles are substantially identical. The particles may have a unimodal particle size distribution or a polymodal size distribution.

As indicated above, the matrix comprises a light transmissive material. The light transmissive material may comprise the luminescent material. For instance, in case of a glass with luminescent ions, the glass may be considered a light transmissive material and a luminescent material. As indicated above, herein the first luminescent material and the light transmissive material are different materials. Hence, would the luminescent bodies be of a glass-type, it comprises another glass and/or another luminescent material (than the light transmissive material of the matrix). Hence, especially at least the first luminescent material and the light transmissive material are different materials.

Especially, the luminescent bodies comprise ceramic bodies. Further, especially, the matrix is not a ceramic body. Note that glass is not considered a ceramic body. As indicated above, the matrix may in embodiments comprise glass material or polymeric material (or combinations thereof). Further, as indicated above, the luminescent bodies may comprise ceramic bodies and the matrix may comprise a light transmissive material with particles embedded therein, such as particles having size within the range of 2 nm-100 µm (see above).

Ceramic bodies are known in the art. Especially, the ceramic material may be obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

In other embodiments, the luminescent bodies may comprise single crystal bodies.

Here below, some further embodiments are described.

In specific embodiments, the first luminescent material and the second luminescent material are different luminescent materials. Hence, in embodiments, upon irradiation with light that can be converted into luminescent material light (i.e. "excitation light"), the first luminescent material and the second luminescent material provide luminescent material light having different spectral power distributions.

Especially, in embodiments upon irradiation with the same light that can be converted into luminescent material by both luminescent materials, such as in embodiments UV and/or blue radiation, the first luminescent material and the second luminescent material provide luminescent material light having different spectral power distributions. However, in yet other embodiments the first luminescent material luminescent material and the second luminescent material may be the same luminescent materials.

When the luminescent materials are the same materials, it may be possible to provide an emission beam which may consist of one or more contributions of different luminescent material light of luminescent bodies which contributions may essentially all have the same spectral power distribution. In this way, the spatial power distribution may in specific embodiments be controllable. When the first and second luminescent materials are different luminescent materials, it may be possible to provide white light or colored light of which the spatial power distribution and the spectral power distribution may in specific embodiments be controllable. In yet further specific embodiments, the correlated color temperature of the light may be controllable. Note that the term "light" here may in embodiments refer to luminescent material light and optional light of a light source (see further below when discussing the light generating system).

In embodiments, both luminescent material materials may be configured to provide luminescent material light having a color point in the visible. In such embodiments, the spectral power distributions may be the same or different. Or, the color points may be the same or different (see also above).

In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram.

In other specific embodiments, colors or color points of a first type of light and a second type of light may be essentially the same when the respective color points of the first type of light and the second type of light differ with at maximum 0.03 for u' and/or with at maximum 0.03 for v', even more especially at maximum 0.02 for u' and/or with at maximum 0.02 for v'. In yet more specific embodiments, the respective color points of first type of light and the second type of light may differ with at maximum 0.01 for u' and/or with at maximum 0.01 for v'. Here, u' and v' are color coordinate of the light in the CIE 1976 UCS (uniform chromaticity scale) diagram.

In specific embodiments, at least two spectral power distributions of the device light (in at least two respective operational modes) may have centroid wavelengths differing least 10 nm, such as at least 20 nm, or even at least 30 nm, such as a difference selected from the range of 30-200 nm.

In specific embodiments, one of the first luminescent material and the second luminescent material is selected from luminescent materials of the type $A_3B_5O_{12}$:Ce, wherein A comprises one or more of Y, La, Gd, Tb and Lu, and wherein B comprises one or more of Al, Ga, In and Sc. The other luminescent material can be another luminescent material, such as described above. The garnet type of luminescent materials can be thermally very stable. Especially, in embodiments the first luminescent material is of the type $A_3B_5O_{12}$:Ce, wherein A comprises one or more of Y, La, Gd, Tb and Lu, and wherein B comprises one or more of Al, Ga, In and Sc. In other embodiments, however the first luminescent material and the second luminescent material are selected from luminescent materials of the type $A_3B_5O_{12}$:Ce, wherein A comprises one or more of Y, La, Gd, Tb and Lu, and wherein B comprises one or more of Al, Ga, In and Sc.

Note that is herein not excluded that there are two or more types of luminescent bodies, which may, respectively, comprise two or more types of luminescent materials. Alternatively or additionally, the second luminescent material may comprise different second luminescent materials, which may optionally spatially be separated (over the matrix). This may (further) allow controlling a spectral power distribution of the light. As indicated above, note that the term "light" here may in embodiments refer to luminescent material light and optional light of a light source (see further below when discussing the light generating system). However, especially the second luminescent material may homogeneously distributed over the matrix (material).

In embodiments, the array comprises a plurality of luminescent bodies. At least, the array comprises two luminescent bodies, such as at least four luminescent bodies. In specific embodiments, the array may comprise up to about 1600 luminescent bodies, though more is also possible. Especially, the luminescent bodies may have equivalent circular diameters in the range of 0.5-50 mm, such as especially 1-50 mm, such as in specific embodiments 1-40 mm (see also above), though smaller or larger sizes may also be possible, such as selected from the range of 0.2-50 mm, such as especially 0.5-25 mm, like in embodiments 1-20 mm. Especially, the array may comprise up to about 100 luminescent bodies. In embodiments, the array is an n*m array, wherein n and m are each individually selected from the range of at least 3. In specific embodiments, n and m are each individually selected from the range of up to about 40. The array may be regular, random, or quasi random. Especially, in embodiments the array of luminescent bodies is a regular 2D array. Hence, in embodiments there may be one or two constant pitches. However, other arrays, like phyllotaxis tessellation or sunflower tessellation, may also be possible.

In embodiments, at least about 5%, such as especially at least about 10% of the cross-sectional area of the arrangement may be defined by the (cross-sectional area of the) luminescent bodies. Further, in embodiments up to about 90%, such as up to about 80% of the cross-sectional area of the arrangement may be defined by the (cross-sectional area of the) luminescent bodies. Hence, in specific embodiments, the luminescent bodies have a first total cross-sectional area A1 and wherein the matrix has a second total cross-sectional area A2, wherein $0.1 \leq A1/A2 \leq 4$. Especially, in embodiments $0.2 \leq A1/A2 \leq 4$, such as $0.5 \leq A1/A2 \leq 4$, like in embodiments $1 \leq A1/A2 \leq 4$. Further, especially in embodiments $0.1 \leq A1/A2 \leq 2$, such as $0.5 \leq A1/A2 \leq 2$, like especially $1 \leq A1/A2 \leq 2$.

Further, in specific embodiments a cross-sectional area of the luminescent bodies define a circular equivalent diameter D, wherein a shortest distance (d1) between adjacent luminescent bodies is selected from the range of $0.1*D \leq d1 \leq 4*D$. More especially, the shortest distance (d1) between adjacent luminescent bodies may be selected from the range of $0.2*D \leq d1 \leq 2*D$, such as $0.5*D \leq d1 \leq 1*D$.

As indicated above, the arrangement may in embodiments be a body. Such body may be self-supporting. However, that is not necessarily the case. Yet further, the arrangement is not necessarily a body.

Hence, in embodiments a support may be used to support the arrangement. The support may have several properties selected from reflective and transmissive and thermally conductive. The former two may be relevant in view of a reflective or a transmissive configuration (see below); the latter may be relevant in view of thermal management. Hence, in embodiments the luminescent arrangement may further comprise a support configured to support the luminescent bodies and the matrix, wherein in specific embodiments the support may be reflective or transmissive for light. Note that the term "light" here may in embodiments refer to light of a light source and/or luminescent material light (see further below when discussing the light generating system).

Yet further, the support may be thermally conductive. Hence, the support may comprise thermally conductive material. Further, in embodiments the support may be a heat sink or heat spreader, or other thermally conductive element, like in embodiments a reflective heatsink or a reflective heat spreader. In other embodiments, the support may be thermally coupled to a heat sink or a heat spreader.

A thermally conductive element especially comprise thermally conductive material. A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K).

In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

The thermally conductive element may comprise a heatsink.

Heatsinks are known in the art. The term "heatsink" (or heat sink) may especially be a passive heat exchanger that transfers the heat generated by device, such as an electronic device or a mechanical device, to a fluid (cooling) medium, often air or a liquid coolant. Thereby, the heat is (at least partially) dissipated away from the device. A heat sink is especially designed to maximize its surface area in contact with the fluid cooling medium surrounding it. Hence, especially a heatsink may comprise a plurality of fins. For instance, the heatsink may be a body with a plurality of fins extending thereof.

A heatsink especially comprises (more especially consists of) a thermally conductive material.

The term "heatsink" may also refer to a plurality of (different) heatsinks.

A heat spreader may be configured to transfer energy as heat from a first element to a second element. The second element may especially be a heatsink or heat exchanger. A heat spreader may passive or active. Embodiments of passive heat spreaders may comprise a plate or block of material having high thermal conductivity, such as copper, aluminum, or diamond. An active heat spreader may be configured to speed up heat transfer with expenditure of energy as work supplied by an external source. Herein, the heat spreader may especially be a passive heat spreader. Alternatively or additionally, the heat spreader may be an active heat spreader, such as selected from the group of heat pipes and vapor chambers.

The luminescent arrangement may especially be used in combination with one or more light sources. Hence, in yet a further aspect the invention provides a light generating system comprising one or more light sources and the luminescent arrangement according to any one of the preceding claims, wherein the one or more light sources are configured to generate one or more beams of light source light, wherein the luminescent arrangement is configured in a light receiving relationship with the one or more light sources.

The term "light source" may in principle relate to any light source known in the art. It may be a conventional (tungsten) light bulb, a low pressure mercury lamp, a high pressure mercury lamp, a fluorescent lamp, a LED (light emissive diode). In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce: LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd: YLF) solid-state laser, promethium 147 doped phosphate glass ($147Pm^{3+}$:glass) solid-state laser, ruby laser ($Al_2O_3$: $Cr^{3+}$), thulium YAG (Tm:YAG) laser, titanium sapphire (Ti:sapphire; $Al_2O_3:Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape,) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot.

This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

In specific embodiments, the light generating system may comprise a plurality of different light sources, such as two or more subsets of light sources, with each subset comprising one or more light sources configured to generate light source light having essentially the same spectral power distribution, but wherein light sources of different subsets are configured to generate light source light having different spectral distributions. In such embodiments, a control system may be configured to control the plurality of light sources. In specific embodiments, the control system may control the subsets of light sources individually.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material. The term "in a light-receiving relationship" does, as indicated above, not exclude the presence of intermediate optical elements, such as lenses, collimators, reflectors, dichroic mirrors, etc. In embodiments, the term "light-receiving relationship" and "downstream" may essentially be synonyms.

Especially, in embodiments the light source(s) comprise laser light sources. Further, in specific embodiments the system comprises a plurality of light sources, configured in an array.

The luminescent materials are configured to convert at least part of the light source light into luminescent material light. In embodiments, the light generating system comprises a plurality of light sources, wherein a first subset of one or more light sources configured to generate first light source light, and a second subset of one or more light sources configured to generate second light source light, wherein the spectral power distributions of the first light source light and the second light source light differs, and wherein the first luminescent material may convert at least part of the first light source light into first luminescent material light, and optionally some of the second light source light into first luminescent material light, and wherein the second luminescent material is configured to convert at least part of the second light source light into first luminescent material light, and optionally part of the first light source light into second luminescent material light. Hence, in specific embodiments the spectral power distribution of the light source light may be controllable.

However, in other embodiments, essentially all light sources of the one or more light sources are configured to generate light source light having essentially the same spectral power distributions, such as LEDs or diodes of the same bin.

Here below, in general the light generating system is explained in relation to light source light, irrespective whether or not the spectral power distribution of the light source light may be controllable.

Hence, as indicated above, the invention also provides a light generating system comprising one or more light sources and the luminescent arrangement as defined herein, wherein the one or more light sources are configured to generate one or more beams of light source light, wherein the luminescent arrangement is configured in a light receiving relationship with the one or more light sources, wherein the first luminescent material and the second luminescent material are configured to convert at least part of the light source light received by the first luminescent material and the second luminescent material into first luminescent material light and second luminescent material light, respectively.

The phrase "the first luminescent material and the second luminescent material are configured to convert at least part of the light source light received by the first luminescent material and the second luminescent material into first luminescent material light and second luminescent material light, respectively" may especially indicate that (a) when the first luminescent material receives light source light, the first luminescent material may especially convert at least part of the light source light into first luminescent material light, and (b) when the second luminescent material receives light source light, the second luminescent material may especially convert at least part of the light source light into second luminescent material light. However, in embodiments, in operational modes only the first luminescent material or only the second luminescent material may receive light source light.

In general, the spatial power distribution of the light source light may be controllable. This may in embodiments be possible based on one or more of the following options: (i) the light generating system comprises a plurality of light sources, like an array of light sources, wherein the light sources are individually controllable, and (ii) the light generating system comprises optics that are controllable.

With controllable light sources, the spatial power distribution of the light source light of the plurality of light sources may be controlled. Hence, in embodiments, a control system may be configured to control the plurality of light sources. With optics, the spatial power distribution of the light source light of the plurality of light sources may be controlled when e.g. the focal point can be controlled or when the extend of focusing can be controlled. Examples of such optics are movable optics or liquid crystal based lenses or electro-wetting based lenses. In embodiments, a moving or scanning mirror may be applied as controllable optics. In yet other embodiments, the controllable optics may comprise a liquid crystal based diffuser. In embodiments, the optics may have a controllable focal length. In yet other embodiments, the optics may comprise a micromirror device. A micromirror device may especially be based on microscopically small mirrors. The micromirror device may especially be a microelectromechanical system (MEMS). The term "optics" may refer to one or more optical elements, like one or more lenses and/or one or more mirrors, etc.

In specific embodiments, the system comprises a plurality of light sources, of which two or more, optionally in combination with optics, may be configured to provide light source light only to a single (respective) luminescent body. Hence, there may be sets of luminescent bodies and light sources, wherein the respective light sources are essentially only radiationally coupled to respective luminescent bodies. In this way, it may e.g. be possible to switch on or of the luminescence of a specific luminescent body. Especially, in embodiments the system may comprise k1 sets of each a luminescent body and a light source (and optionally optics), wherein the light source is configured to irradiate, in an operational mode, the specific luminescent body. Especially, in embodiments k1≥2, such as k1≥4. Hence, in specific embodiments the system comprises a plurality of light sources, configured in an array. In specific embodiments, an array of luminescent bodies and an array of light sources have essentially the same symmetries.

With the optics and/or with the plurality of light sources, one or more beams may be generated. When controlling the plurality of beams, the spatial power distribution can be controlled, and/or when controlling optics the spatial power distribution of the one or more beams can (also be controlled). Hence, in embodiments the control system may be configured to control the optics. Therefore, in specific embodiment the one or more beams may have a spatial power distribution relative to the luminescent arrangement, wherein the spatial power distribution is controllable, wherein the light generating system further comprises a control system configured to control one or more of (i) the one or more light sources, and (ii) the spatial power distribution of the one or more beams of the one or more light sources relative to the luminescent arrangement.

Especially, in embodiments the one or more light sources are selected from the group consisting of LEDs, laser diodes, and superluminescent diodes. In embodiments, the one or more light sources are selected from the group consisting of LEDs. In other embodiments, the one or more light sources are selected from the group consisting of laser diodes. In yet other embodiments, the one or more light sources are selected from the group consisting of superluminescent diodes. In specific embodiments, when there are a plurality of light sources, the light sources are selected from the same bin.

As indicated above, in embodiments the spatial distribution of the beam(s) may be controlled. In this way, it may be possible e.g. to only address one or more luminescent bodies or luminescent bodies and the matrix, or substantially only the matrix, etc. In this way, it may be possible to control the spatial distribution of the beam(s) of luminescent light and/or control the spectral power distribution of the luminescent light. Further, as the light that escapes from the arrangement may be a combination of the luminescent light of one or more luminescent materials and light source light, it may in embodiments also be possible to control the spectral power distribution of the system light. The system light is the light that escapes from the light generating system during operation of the system. In operational modes, the system light may comprise luminescent material light of one or more of the first luminescent material and the second luminescent material, and optionally light source light of the one or more light sources. In specific embodiments, the control system may be configured to control the spectral power distribution of the system light.

In specific embodiments, the system light may be visible light. Yet, in embodiments in one or more operational modes, the system light may be white light. In specific embodiments, the control system may be configure to control one or more of the color point and the color temperature of the system light.

In embodiments, during an operational mode the light generating system may be configured to irradiate with at least 80% of the light source light the luminescent bodies and with at maximum 20% of the light source light the matrix. In specific embodiments, during an operational mode the light generating system may be configured to irradiate with at least 90% of the light source light the luminescent bodies and with at maximum 10% of the light source light the matrix. In such embodiments, essentially only first luminescent material light may be generated.

In other embodiments, during an operational mode the light generating system may be configured to irradiate with at maximum 20% of the light source light the luminescent bodies and with at least 80% of the light source light the matrix. In specific other embodiments, during an operational mode the light generating system may be configured to irradiate with at maximum 10% of the light source light the luminescent bodies and with at least 90% of the light source light the matrix. In such embodiments, essentially only second luminescent material light may be generated.

Hence, in yet further embodiments, during an operational mode the light generating system may be configured to irradiate with x % of the light source light the luminescent bodies and with 100−x % of the light source light the matrix. Herein, x may vary between 0-100, such as in the range of 30-70, or in the range of 20-80, or in the range of 0-10, or in the range of 90-100. However, other ranges may also be possible.

The arrangement may be configured such relative to the light sources, that the arrangement is configured in the reflective mode. However, in other embodiments the arrangement may be configured such relative to the light sources, that the arrangement is configured in the transmissive mode.

In the reflective mode, optionally one or more dichroic beam splitter may be applied. Such optics may in embodiments be used to reflect luminescent material and transmit light source light, or to reflect light source light and transmit luminescent material light.

In the transmissive mode, it may be relatively easy to have light source light admixed in the luminescent material light, which may be useful for generating the desirable spectral power distribution. In the reflective mode, thermal management may be more easy, as a substantial part of the luminescent material may be in thermal contact with a thermally conductive element, like a heatsink or heat spreader. In the reflective mode, a part of the light source light may in embodiments be reflected by the luminescent material and/or a reflector and may be admixed in the luminescent material light. The reflector may be configured downstream of the luminescent material (in the reflective mode).

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The terms "visible", "visible light" or "visible emission" and similar terms refer to light having one or more wavelengths in the range of about 380-780 nm. Herein, UV may especially refer to a wavelength selected from the range of 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like an iPhone or another type of smartphone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Especially, the control system may be configured to control a plurality of light sources (comprised by the system). In embodiments, the light sources may be configured to generate light source light having essentially the same spectral power distributions. Further, in embodiments the control system may be configured to control optics, which may be used to shape the beam(s) of light source light.

A plurality of beams of light source light (from different light sources) may form a single beam of light source light.

In embodiments, the control system may be configured to control the spectral power distribution of the system light. Especially, the system light may (in one or more operational modes) comprise one or more of the first luminescent material light and second luminescent material light.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. . . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, and an optical wireless communication device, comprising the light generating system as defined herein. In embodiments, the light generating system or the lamp may comprise a (dynamic) spot light.

The light generating device may comprise a housing or a carrier, configured to house or support, one or more elements of the light generating system. For instance, in embodiments the light generating device may comprise a housing or a carrier, configured to house or support one or more of the arrangement and the one or more light sources, optionally one or more optics, etc.

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

Herein, UV (ultraviolet) may especially refer to a wavelength selected from the range of 190-380 nm, though in specific embodiments other wavelengths may also be possible.

Herein, IR (infrared) may especially refer to radiation having a wavelength selected from the range of 780-3000 nm, such as 780-2000 nm, e.g. a wavelength up to about 1500 nm, like a wavelength of at least 900 nm, though in specific embodiments other wavelengths may also be possible. Hence, the term IR may herein refer to one or more of near infrared (NIR (or IR-A)) and short-wavelength infrared (SWIR (or IR-B)), especially NIR.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
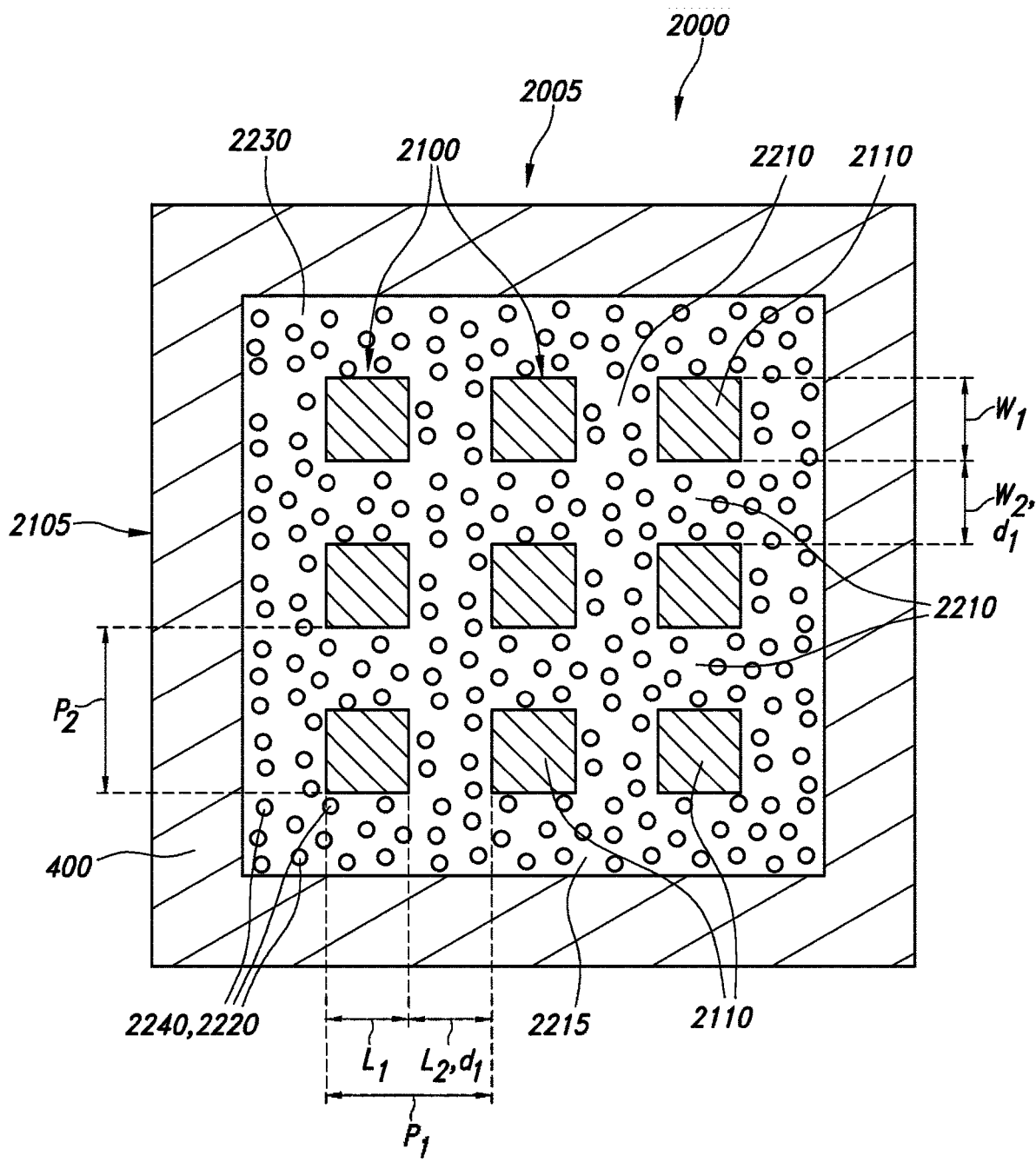
FIGS. 1a-1f schematically depict some aspects and embodiments.

FIG. 1a schematically depicts a luminescent arrangement 2000 comprising an array 2005 of luminescent bodies 2100, and a matrix 2210 at least partly configured between the luminescent bodies 2100.

The luminescent bodies 2100 comprise a first luminescent material 2110. The matrix 2210 comprise a light transmissive material 2215. The light transmissive material 2215 comprises a second luminescent material 2220.

Especially, the first luminescent material 2110 and the light transmissive material 2215 are different materials.

Further, in embodiments the luminescent bodies 2100 comprise ceramic bodies.

In embodiments, the matrix 2210 may at least partly defined by a continuous phase 2230 with luminescent particles 2240 embedded therein. In embodiments, the luminescent particles 2240 may comprise the second luminescent material 2220.

Especially, in embodiments the luminescent bodies 2100 may at least partly embedded in the continuous phase 2230. In embodiments, the continuous phase 2230 comprise an organic polymeric material. Alternatively or additionally, in embodiments the continuous phase 2230 comprise an inorganic material. Other embodiments, however, may also be possible.

In specific embodiments, the first luminescent material 2110 and the second luminescent material 2220 are different luminescent materials. In other specific embodiments the first luminescent material luminescent material 2110 and the second luminescent material 2220 are the same luminescent materials.

Especially, in embodiments the first luminescent material 2110 and/or the second luminescent material 2220, especially at least the first luminescent material 2110, are selected from luminescent materials of the type $A_3B_5O_{12}$:Ce, wherein A comprises one or more of Y, La, Gd, Tb and Lu, and wherein B comprises one or more of Al, Ga, In and Sc.

In embodiments, the array 2105 of luminescent bodies 2100 is a regular 2D array. Hence, as schematically depicted the array 2105 has an equal pitch in one direction or equal pitches in two directions, respectively.

In specific embodiments, the luminescent bodies 2100 may have a first total cross-sectional area A1 and the matrix 2210 may have a second total cross-sectional area A2, wherein $0.1 \leq A1/A2 \leq 4$.

Especially, in embodiments a cross-sectional area of the luminescent bodies 2100 define a circular equivalent diameter D, wherein a shortest distance dl between adjacent luminescent bodies 2100 is selected from the range of $0.1*D \leq d1 \leq 4*D$.

The luminescent bodies in FIG. 1a have a length L1 and a width W1, defining a cross-sectional area A1. The shortest distances di are also indicated with L2 and W2, which are the shortest distances in a length and width direction, respectively.

Figure 1B:
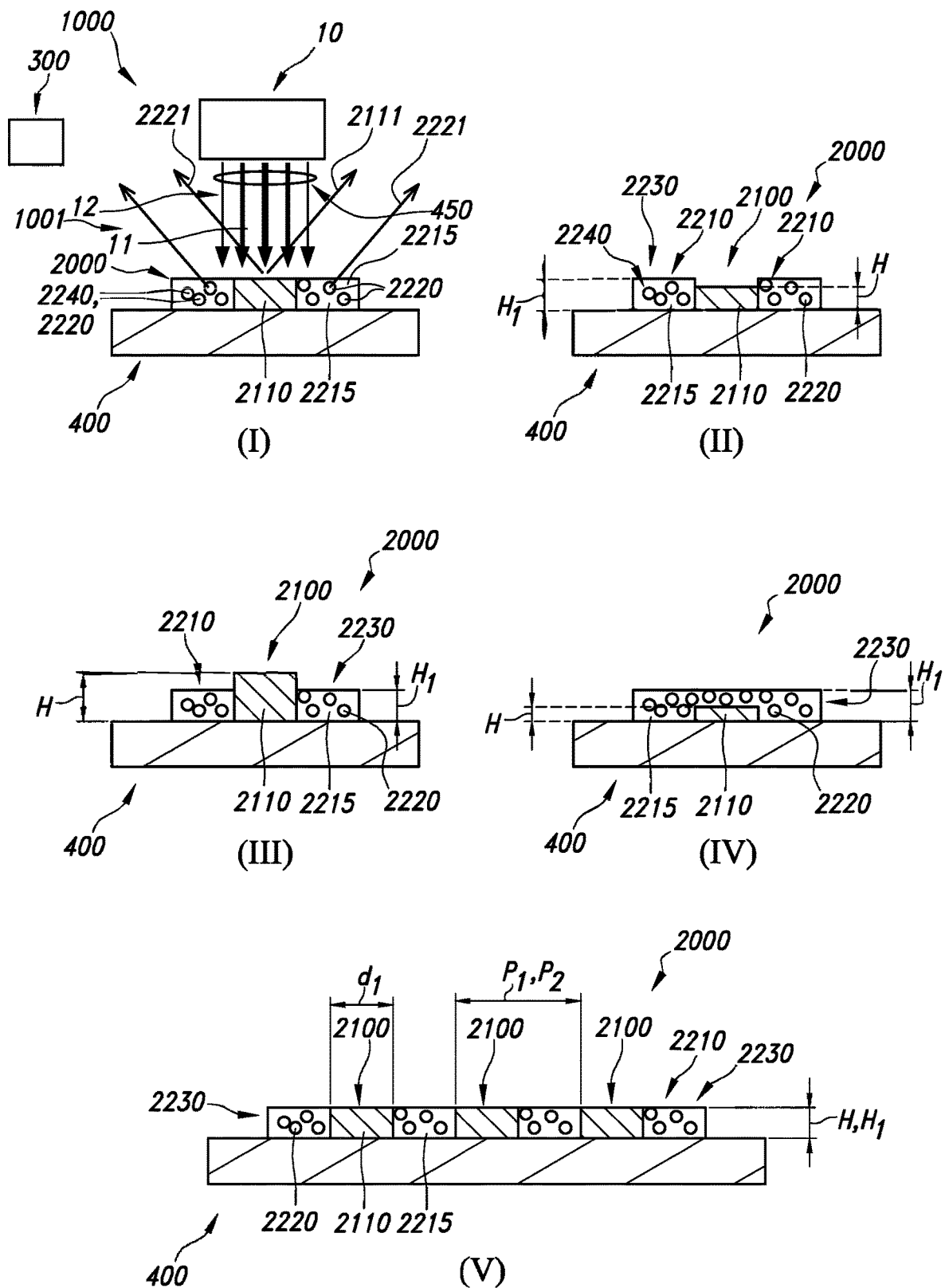

FIG. 1b schematically depict a number of embodiments. In embodiments, I and V the height of the luminescent bodies 2100 and the matrix 2210 are essentially the same. In embodiments II and IV the height of the luminescent bodies

2100 is smaller than of the matrix 2210. In embodiments IV, the matrix 2210 even encloses the luminescent body 2100. In embodiments III the height of the luminescent body (bodies) 2100 is larger than of the matrix 2210. The heights of the luminescent bodies 2100 is indicated with H and of the matrix 2210 with H1.

FIG. 1*b* also schematically depicts an embodiment of the luminescent arrangement 2000 further comprising a support 400 configured to support the luminescent bodies 2100 and the matrix 2210. In embodiments, the support 400 may be reflective or transmissive for light.

In the embodiment of FIG. 1*b*, the support 400 may especially be reflective. A reflective mode is depicted in embodiment I of FIG. 1*b*.

Reference 300 schematically depicts a control system, which may be configured to control the one or more light sources 10 and/or the optics 450 (see also below). Hence, FIG. 1*b* also schematically depicts an embodiment of a light generating system 1000 comprising one or more light sources 10 and the luminescent arrangement 2000 as described herein.

The one or more light sources 10 are especially configured to generate one or more beams 12 of light source light 11.

In embodiments, the one or more light sources 10 may be selected from the group consisting of LEDs, laser diodes, and superluminescent diodes. Especially, in embodiments the one or more light sources 10 may comprise laser diodes.

As schematically depicted the luminescent arrangement 2000 is configured in a light receiving relationship with the one or more light sources 10.

Especially, the first luminescent material 2110 and the second luminescent material 2220 are configured to convert at least part of the light source light 11 received by the first luminescent material 2110 and the second luminescent material 2220 into first luminescent material light 2111 and second luminescent material light 2221, respectively.

Reference 450 refers to optics, which may especially be controllable. As indicated above, in embodiments, a moving or scanning mirror may be applied as controllable optics. In yet other embodiments, the controllable optics may comprise a liquid crystal based diffuser. In embodiments, the optics may have a controllable focal length. In yet other embodiments, the optics may comprise a micromirror device. A micromirror device may especially be based on microscopically small mirrors. The micromirror device may especially be a microelectromechanical system (MEMS). The term "optics" may refer to one or more optical elements, like one or more lenses and/or one or more mirrors, etc. The optics may thus be controllable, such as by the control system 300.

Other optics than depicted may be available, such as e.g. (polarizing) beam splitters, dichroic beam splitter, half mirrors, mirrors, etc. etc.

Here, the optics 450 are very schematically depicted. Further, the system is schematically depicted in the reflective mode. However, the transmissive mode may also be possible.

In the reflective mode, optionally one or more dichroic beam splitter may be applied (not depicted). Such optics may in embodiments be used to reflect luminescent material and transmit light source light, or to reflect light source light and transmit luminescent material light.

Reference 1001 refers to system light, that may escape from the system. In operational modes the system light 1001 may comprise one or more of (a1) first luminescent material light 2111 and (a2) second luminescent material light 2221, and may optionally also comprise light source light 11. E.g. with the optics and/or the choice which light sources 10 provide light (or the intensity of the light 11 of the respective light sources 10), the spectral power distribution of the system light 1001 may be controllable.

Figure 1C:
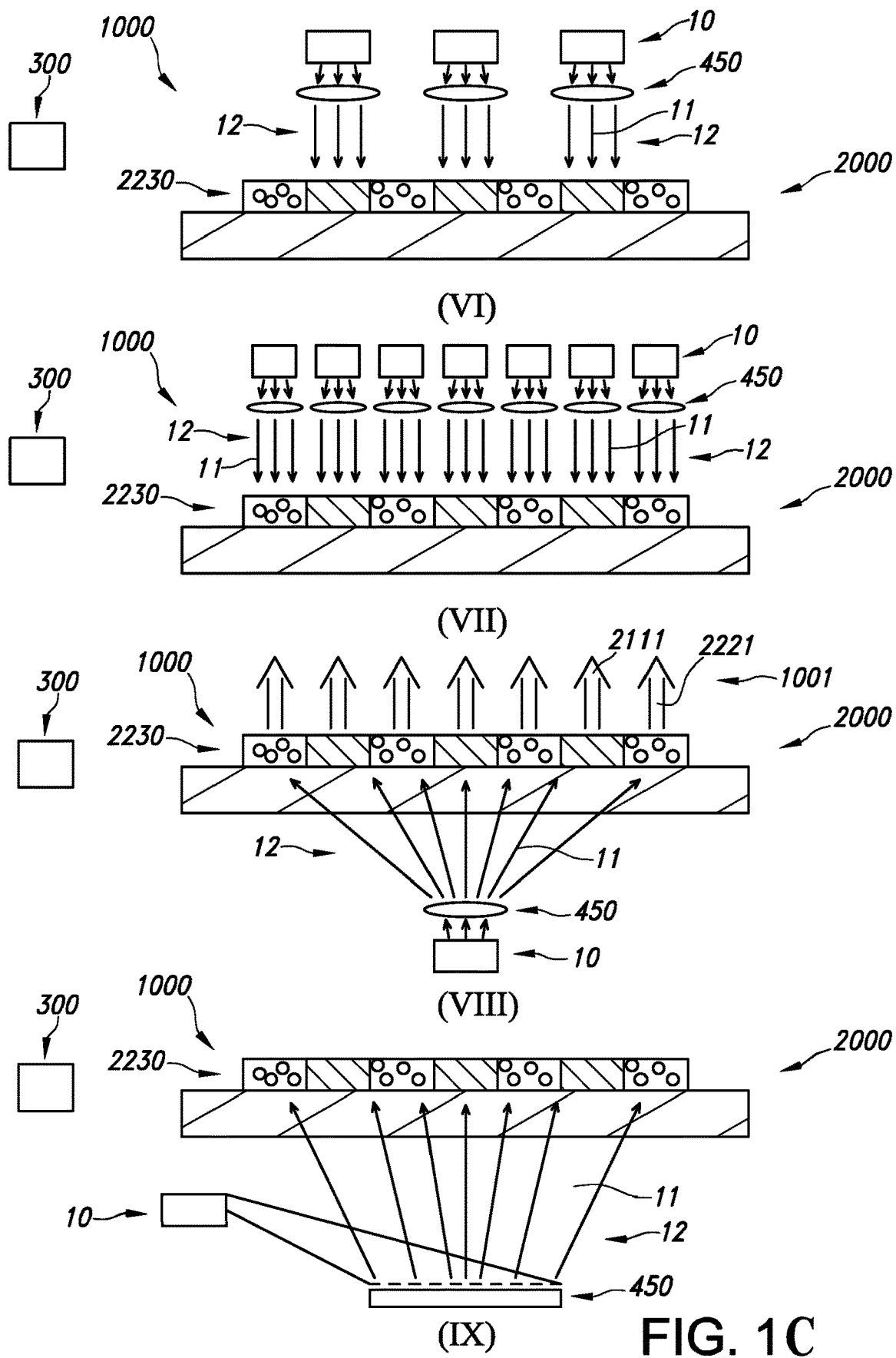

FIG. 1*c* schematically depict a number of embodiments. In embodiments VI-IX (and embodiment I) schematically depict a non-limiting number of embodiments of the way in which different parts of the arrangement may be illuminated with light source light 11.

Embodiment VI shows light sources of which the beam 12 of light source light is controllable with the optics 450, which may be controllable. These optics may e.g. have a controllable focus (in the depth direction) and/or may be laterally movable.

Embodiment VII shows an array of light sources 10, optionally with optics 450. These optics may not be necessarily controllable. But as the light source 10 may be controlled, also the beams 12 of light source light 11 may be controlled.

Referring to e.g. embodiments VI and VII, the light sources 10 may be laser light sources.

Embodiments VIII and IX schematically depict transmissive modes. Embodiment VIII shows a light transmissive support 400. Embodiment IX shows a self-supporting arrangement 2000. In embodiment VIII by way of example a controllable lens has been depicted as controllable optics 450. In embodiments IX a micromirror as example of a controllable optics 450 has been depicted.

Figure 1D:
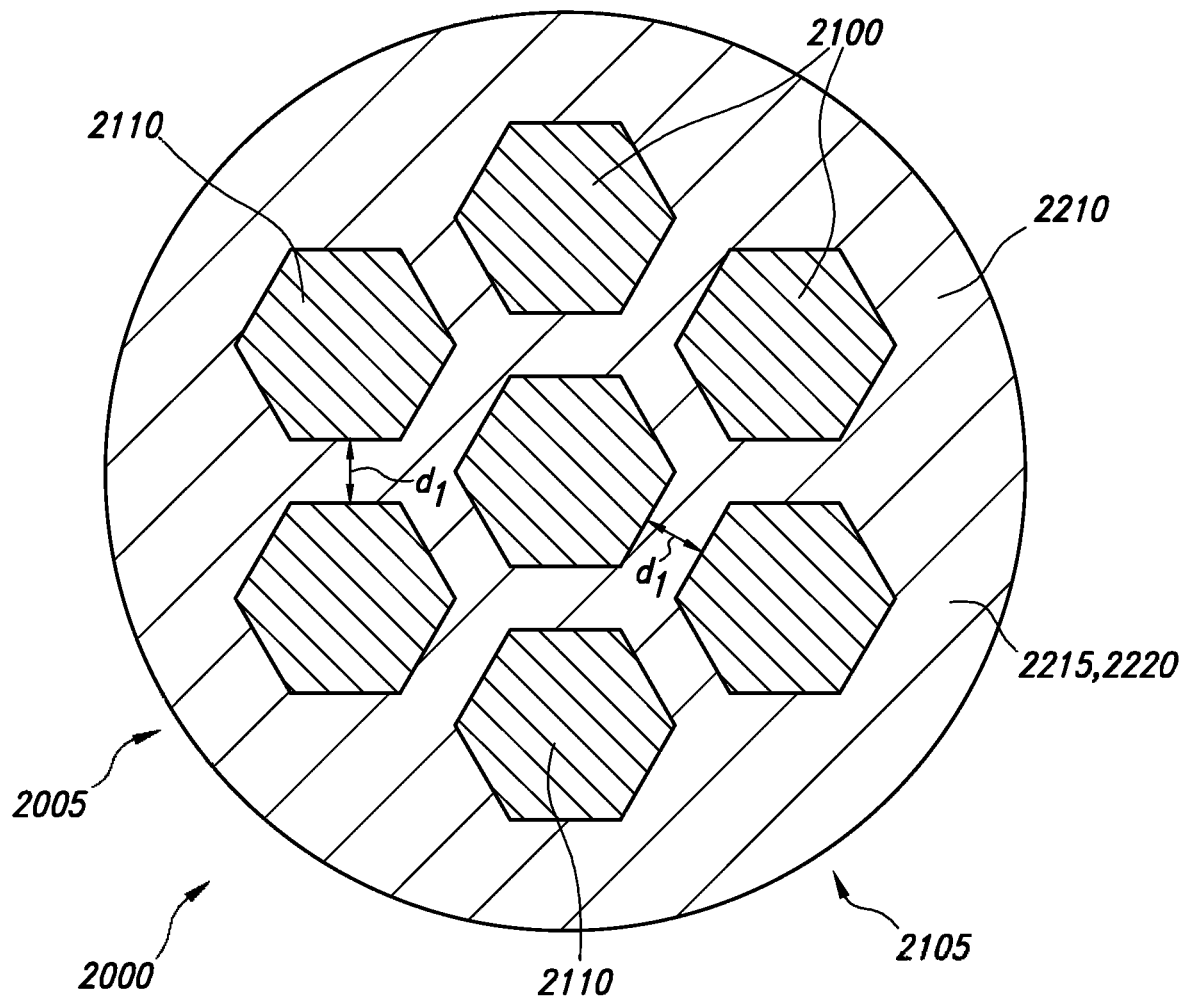

FIG. 1*d* schematically depicts another array of the luminescent bodies 2100. However, yet other arrangements may be possible.

Figure 1E:
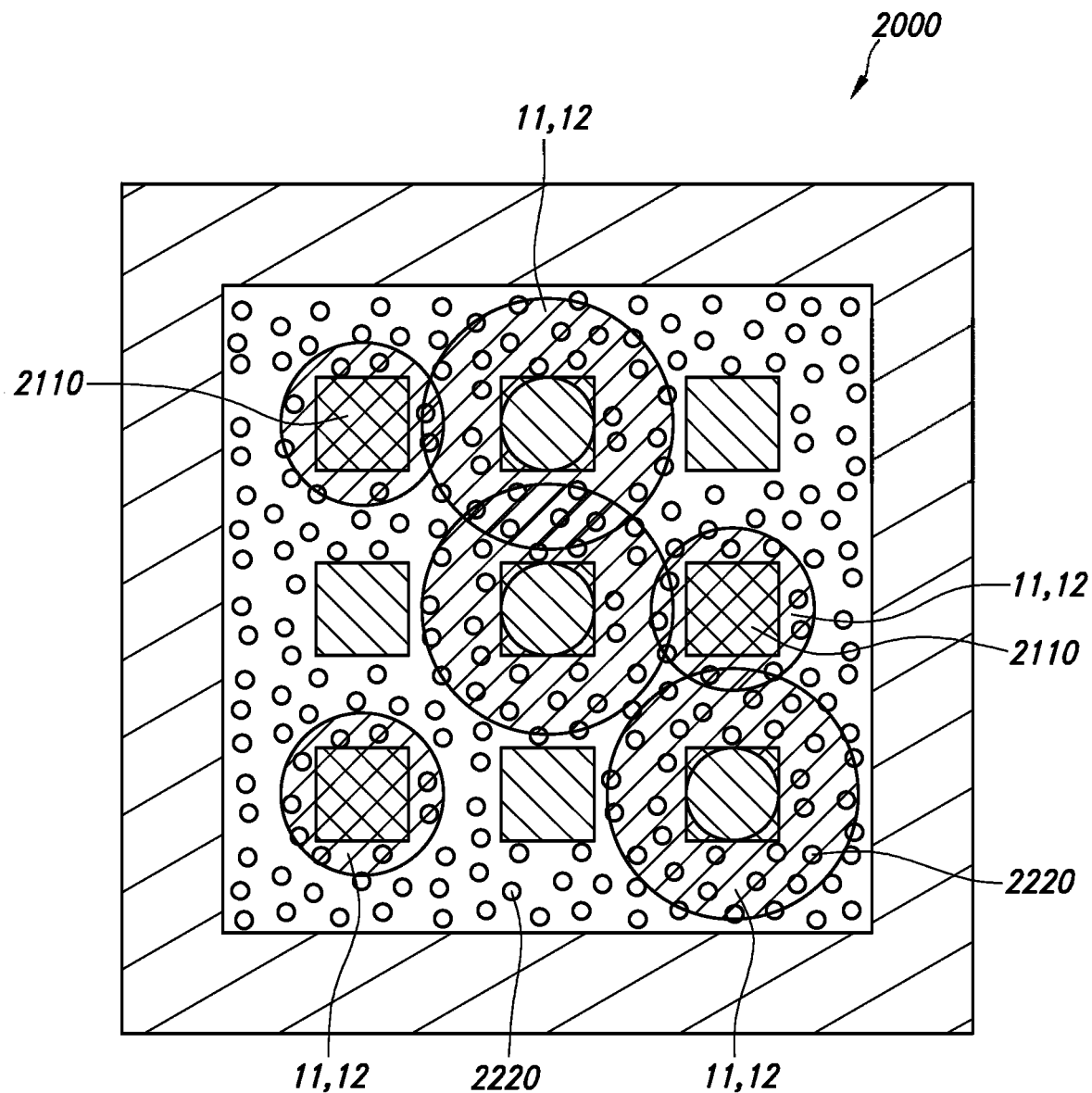
Figure 1F:
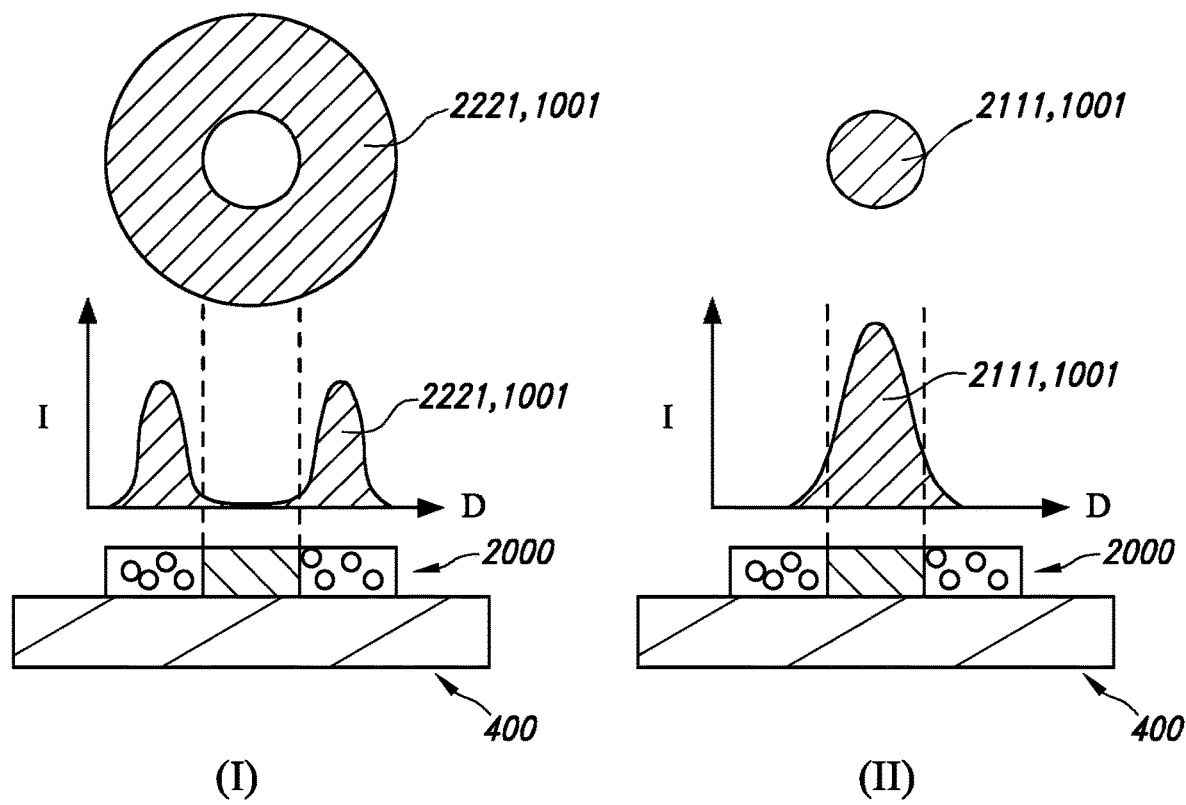

Referring to FIGS. 1*e* and 1*f*, some embodiments and variants are schematically depicted wherein the beam shape of the one or more beams may be controllable. This may lead to selective excitations. This may lead to different beams shapes of the luminescent material light escaping from the arrangement and/or different spectral power distributions of the luminescent material light escaping from the arrangement. Here, beams 12 of light source 11 are schematically depicted. As can be understood, different beams of light source light and/or at different locations may provide light escaping from the arrangement 2000 having different spectral power distributions, especially when the first luminescent material and second luminescent material are different.

FIG. 1*f* schematically depicts in embodiment I that light source light (not shown, but the beam of light source light may have a similar shape as the schematically depicted hollow circular beam of system light 1001) may essentially only irradiate the second luminescent material 2220 and essentially not the first luminescent material 2110. This may lead to essentially only second luminescent material light 2221, which may have e.g. have a ring shape. Hence, the system light 1001 in such operational mode essentially only second luminescent material light 2221. On the right, in embodiment II, an embodiment is schematically depicted wherein the light source light (not shown, but the beam of light source light may have a similar shape as the schematically depicted circular beam of system light 1001) may essentially only irradiate the first luminescent material 2110 and essentially not the second luminescent material 2220. This may lead to essentially only first luminescent material light 2111, which may have e.g. have a circle shape. Of course, when controlling (with the control system (not depicted)) the beam shape of the beam(s) of light source light, the spectral power distribution of the system light 1001 may in embodiments be controlled.

Hence, in embodiments the one or more beams 12 have a spatial power distribution relative to the luminescent arrangement 2000, wherein the spatial power distribution is controllable, wherein the light generating system 1000 further comprises a control system 300 configured to control one or more of (i) the one or more light sources 10, and (ii) the spatial power distribution of the one or more beams 12 of the one or more light sources 10 relative to the luminescent arrangement 2000.

For instance, in embodiments during an operational mode (of the light generating system 1000), the light generating system 1000 is configured to irradiate with at least 90% of the light source light 11 the luminescent bodies 2100 and with at maximum 10% of the light source light 11 the matrix 2210.

Figure 2:
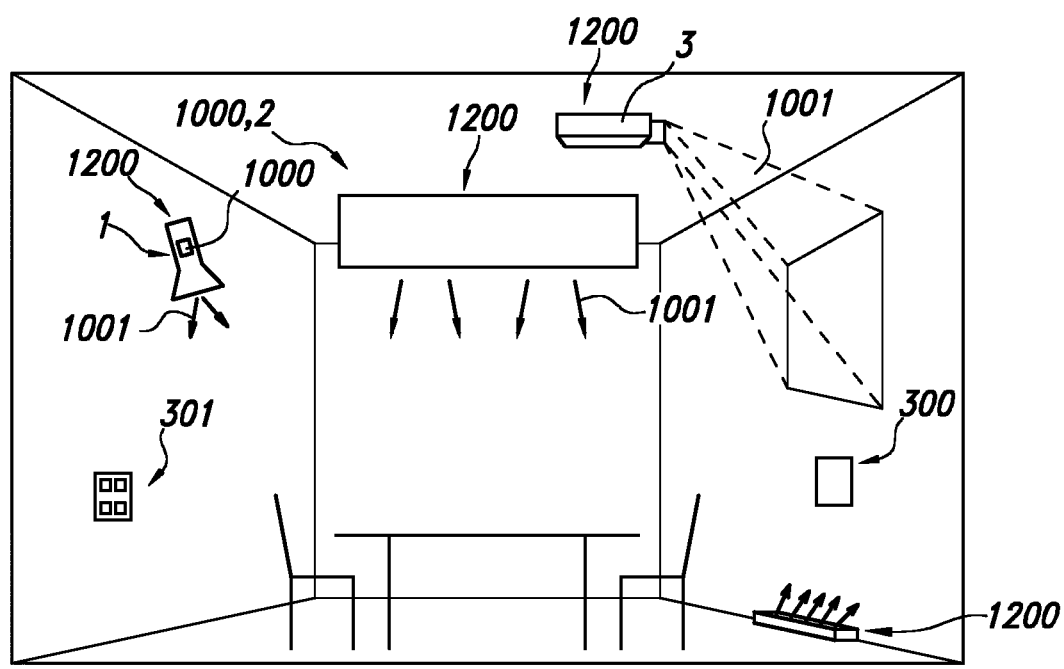
FIG. 2 schematically depict some applications. The schematic drawings are not necessarily to scale.

FIG. 2 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 2 also schematically depicts an embodiment of lamp 1 comprising the light generating system 1000. Reference 3 indicates a projector device or projector system, which may be used to project images, such as at a wall, which may also comprise the light generating system 1000. Reference 1200 refers to a lighting device, which may e.g. be selected from the group of a lamp 1, a luminaire 2, a projector device 3. The lighting device 1200 comprises the light generating device 1000. However, in embodiments the lighting device 1200 may also comprise a disinfection device or an optical wireless communication device (comprising the light generating device 1000). FIG. 2 also schematically depicts an embodiment of the lighting device 1200 comprising a wall light device (such as especially wall washers). The lighting device 1200 may also comprise a cove lighting device (for illuminating a cove).

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system for generating system light, comprising one or more light sources, a luminescent arrangement and a support;

the luminescent arrangement comprising an array of luminescent bodies, and a matrix at least partly configured between the luminescent bodies, wherein the luminescent bodies comprise a first luminescent material, wherein the matrix comprises a light transmissive material, wherein the light transmissive material comprises a second luminescent material, wherein the first luminescent material and the light transmissive material are different materials; and wherein the luminescent bodies are ceramic bodies;

wherein the light transmissive material comprises one or more of a glass, an inorganic polymeric material, an organic polymeric material, quarts and silica;

wherein the one or more light sources are configured to generate one or more beams of light source light, wherein the luminescent arrangement is configured in a light receiving relationship with the one or more light sources, wherein the first luminescent material and the second luminescent material are configured to convert at least part of the light source light received by the first luminescent material and the second luminescent material into first luminescent material light and second luminescent material light, respectively;

wherein the first luminescent material comprises a luminescent material of the type $A_3B_5O_{12}$:Ce, wherein A comprises one or more of Y, Gd, Lu, and wherein B comprises one or more of Al, Ga, In and Sc;

wherein the one or more light sources comprise a laser diode or a superluminescent diode;

wherein the support comprises a thermally conductive material and being configured to support the luminescent bodies and the matrix;

wherein the system light comprises luminescent material light of one or more of the first luminescent material and the second luminescent material, and optionally light source light of the one or more light sources; and wherein the system light is white light having a correlated color temperature (CCT) in the range of 2700 K and 5500 K.

2. The light generating system according to claim 1, wherein the matrix is defined by a continuous phase with luminescent particles embedded therein, wherein the luminescent particles comprise the second luminescent material, and wherein the luminescent bodies are at least partly embedded in the continuous phase.

3. The light generating system according to claim 2, wherein the continuous phase comprises an organic polymeric material.

4. The light generating system according to claim 2, wherein the continuous phase comprises an inorganic material.

5. The light generating system according to claim 3, wherein the first luminescent material and the second luminescent material are different luminescent materials.

6. The light generating system according to claim 3, wherein the first luminescent material luminescent material and the second luminescent material are the same luminescent materials.

7. The light generating system according to claim 1, wherein the second luminescent material is selected from luminescent materials of the type $A_3B_5O_{12}$:Ce, wherein A comprises one or more of Y, Gd and Lu, and wherein B comprises one or more of Al, Ga, In and Sc.

8. The light generating system according to claim 1, wherein the luminescent bodies have a first total cross-sectional area A1 and wherein the matrix has a second total cross-sectional area A2, wherein $0.1 \leq A1/A2 \leq 4$.

9. The light generating system according to claim 1, wherein a cross-sectional area of the luminescent bodies define a circular equivalent diameter D, wherein a shortest distance (d1) between adjacent luminescent bodies is selected from the range of $0.1*D \leq d1 \leq 4*D$.

10. The light generating system according to claim 1, wherein the support is reflective or transmissive for light.

11. The light generating system according to claim 9, wherein the circular equivalent diameter D is in the range $D \geq 2*H$, wherein H is the height of the luminescent bodies.

12. The light generating system according to claim 11, wherein the one or more beams have a spatial power distribution relative to the luminescent arrangement, wherein the spatial power distribution is controllable, wherein the light generating system further comprises a control system configured to control one or more of (i) the one or more light sources, and (ii) the spatial power distribution of the one or more beams of the one or more light sources relative to the luminescent arrangement.

13. The light generating system according to claim 11, wherein the one or more light sources are selected from the group consisting of laser diodes and superluminescent diodes.

14. The light generating system according to claim 11, wherein the beam shape of the one or more beams of light source light is controllable and wherein during an operational mode the light generating system is configured to irradiate with at least 80% of the light source light the luminescent bodies and with at maximum 20% of the light source light the matrix.

15. A light generating device selected from the group of a lamp, a luminaire, a projector device, a disinfection device, and an optical wireless communication device, comprising the light generating system according to claim 12.

* * * * *